United States Patent [19]

Danielson

[11] 4,061,513
[45] Dec. 6, 1977

[54] WRAPPING APPARATUS FOR PIPELINE JOINTS

[76] Inventor: Carl G. Danielson, P.O. Box 24248, Houston, Tex. 77029

[21] Appl. No.: 752,137

[22] Filed: Dec. 20, 1976

[51] Int. Cl.² .................. B65H 81/00; B65H 23/06
[52] U.S. Cl. .................................. 156/392; 242/75.4
[58] Field of Search ............. 156/392, 428; 242/75.4

[56] References Cited

U.S. PATENT DOCUMENTS

| 3,470,057 | 9/1969 | Stuart, Jr. et al. | 156/392 |
| 3,547,731 | 12/1970 | Stuart, Jr. et al | 156/392 |
| 4,008,114 | 2/1977 | Lindsey | 156/392 |

Primary Examiner—Douglas J. Drummond
Attorney, Agent, or Firm—Donald Gunn

[57] ABSTRACT

Wrapping apparatus for a pipeline joint is disclosed. The preferred and illustrated embodiment incorporates a set of rollers which carry the body of the mechanism around a pipeline at the bare weld. The apparatus carries a roller and the roller dispenses sheet wrapping material. The apparatus has a framework which is somewhat similar to a clamp mechanism, having a throat which enables it to open and close and thereby clamp the mechanism to the pipe. It is adjustable to accomodate pipes of different diameters.

10 Claims, 4 Drawing Figures ers. It is constructed of a framework which functions as a clamp having rollers at each end. It extends sufficiently around the pipe to grasp the pipe and encompasses more then 180° and is thereby held against the pipe. The rollers permit the device to be rotated around the pipe. The framework carries a spool of coating material. The coating material is adhesively joined to the bare pipe and, after one revolution, the pipe is fully coated and the machine may be removed.

WRAPPING APPARATUS FOR PIPELINE JOINTS

BACKGROUND OF THE INVENTION

Natural gas, petroleum products, and chemicals are pumped through pipelines. The pipeline is typically formed of a high grade or quality of steel. The pipeline is buried in the earth. As a result of the flow of the product through the pipeline, galvanic currents flow in the earth from the pipeline. These currents tend to weaken the steel pipeline by depositing some of the metal of the pipeline in the earth. The situation, if not prevented, can become so bad that the wall of the pipe is weakened and catastrophic ruptures can occur. Indeed, substantially all the metal can be carried away and a hole formed in the pipe. This is dangerous and is often the cause of explosions.

Pipelines have heretofore been protected by the incorporation of an insulated material about the pipe. The insulated material is formed typically of tar and felt paper. The tar and felt paper serves as an electrical insulator. It blocks the current flow and accordingly resists the weakening of the pipeline wall. The coating process is advantageously performed at the facilities of a fixed yard. The pipe is made in joints and each joint is coated. In the field, the joints are joined together by welding. On larger pipe, an internal weld is placed at the butt connection of adjacent joints and an external bead is also formed. The pipe must be cleaned back to bare the ends. The ends thus are stripped of their tar and felt paper coating. This then leaves the weld and an adjacent few inches exposed after the welding job has been completed. It is therefore necessary to dress the welded portion of the pipe in the field to cover of the weld in the immediate vicinity of the pipeline. Typically, this represents a band or strip of bare metal at the weld which has a width somewhat between four and eight inches.

In times past, the welds have been inspected for weld quality and thereafter they have been tar coated. Many techniques have been used. For instance, it is possible to heat a pot of tar and to mop it onto the surface, thereafter permitting it to cool to serve as the complete patch on the pipeline. By contrast, this is a labor intensive step whereas the method of coating pipe in a pipe yard is highly automated. Because labor costs are extremely high, and moreover, the labor must be performed under the most difficult conditions quite often, it is desirable to improve on the method and manner in which the pipe welds are coated.

The present invention represents an advance over the devices and mechanisms by which pipe welds have been field coated.

The present invention further constitutes an improvement in that it does not require skilled labor. The present invention is advantageous in that it permits a perfect coating to be placed on the pipe. The perfect coating is supplied in sheet form on a spool and is perfect in the sense that it does not have holes, gaps or thin spots in it. When applied, it has a uniform thickness which provides a margin of safety for the coating.

SUMMARY OF THE DISCLOSURE

The present invention and the particular disclosed embodiment are summarized as a pipe coating apparatus which places sheet coating material around bare pipe, typically being placed at the weld joining two joints of pipe together. The apparatus incorporates several roll-

DESCRIPTION OF THE PREFERRED EMBODIMENT

Figure 1:
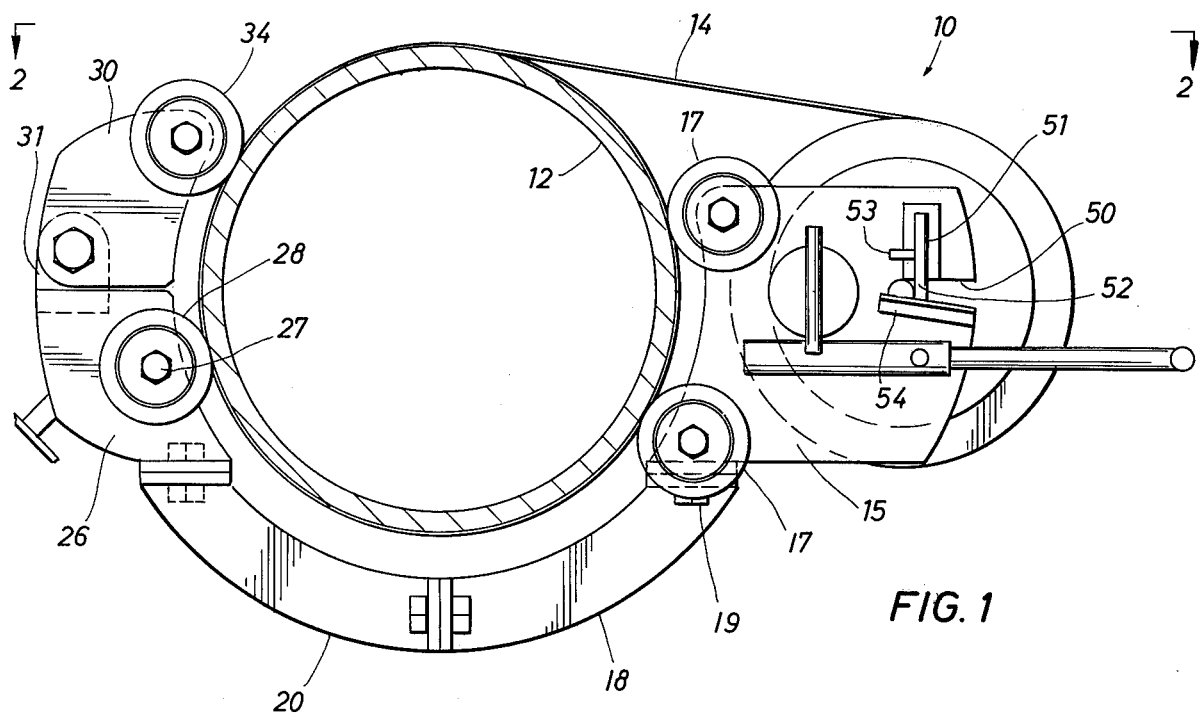
FIG. 1 is a side view of the wrapping apparatus of the present invention showing it positioned about a pipe for wrapping the pipe with a coating material.

In FIG. 1, the pipe wrapping apparatus of the present invention is identified by the numeral 10. It is positioned around a pipe 12 which is to be coated. It applies a wrap of coating material 14. The coating material 14 is an insulative material. It insulates and prevents electrical shorts. In particular, it is able to place a wrap of insulative material which is applied as a cigarette wrap, not as a spiral wrap. A spiral wrap has a lead angle and advances along the pipe. A cigarette wrap utilizes wrapping material applied at right angles.

Figure 2:
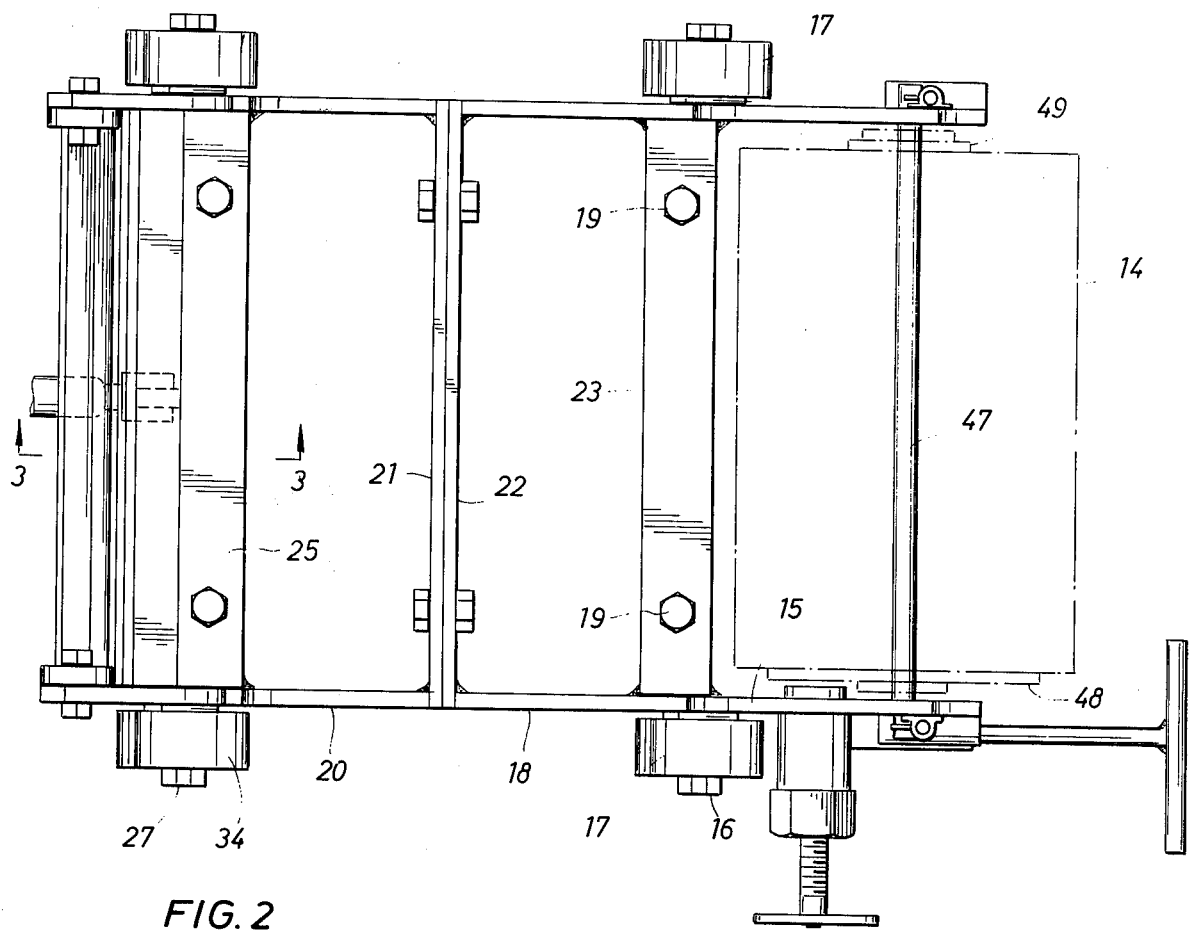
FIG. 2 is a plan view of the apparatus shown in FIG. 1 where the pipe has been omitted to show details of construction of the framework and rollers.

The present invention incorporates symetrically constructed equipment at each end other than the brake and handle shown at one end in FIG. 2 of the drawings. It will therefore be described referring primarily to the left hand end, keeping in mind that the right hand end of the equipment is symetrically constructed.

The left hand end includes a mounting plate 15. The plate 15 supports a stub shaft 16 which in turn supports a roller 17. The roller 17 contacts the exterior of the pipe 12 and guides the equipment in conjunction with other rollers as will be described. The plate 15 thus supports an additional roller 17 of like construction.

The two plates support a transverse frame member at one corner, and a curved brace 18 (FIG. 1) is bolted to the member by a bolt 19. The curved brace 18 is arcuately curved to encompass about one-quarter of the pipe 12. The curved brace 18 is matched along one side by a similar curved brace 20. The two join at a pair of transverse frame members 21 and 22 better shown in FIG. 2. Thus, it will be understood that the brace 18 is joined to the transverse member 22. At the opposite side of the equipment, the brace 18 is duplicated as previously mentioned. The brace 18 is aligned with the plate 15 as better illustrated in FIG. 2 of the drawings. For strength and rigidity, a transverse plate 23 spans the equipment between the end plates 15. The transverse frame member is shown in edge view in FIG. 1 obscured behind the lower right roller 17. The bolt 19 is duplicated at two or three locations.

As viewed in FIG. 2, it will be seen that the two braces 18 along with the transverse frame members 22 and 23 form a generally rectangular framework which is attached to the end plates 15. Moreover, this is duplicated by the provision of the two braces 20 which is attached to the transversly extending frame members 21 and 25. The transverse frame member 25 which is parallel to the member 21. The brace 20 is bolted to a side plate 26. The side plate 26 lies in a common plane with the brace 20. The side plate 20 supports a shaft 27 which in turn positions and secures a roller 28 for contact against the pipe 12.

The side plate 26 supports a single roller. An extension of the side plate is identified by the numeral 30. The plate 30 is constructed in similar fashion to the plate 26. However, the plate 30 is pivotally mounted. A tab 31 affixed to the side plate 26 extends above the edge of it and supports a bolt 32 which functions as a pivot for the extension plate 30. The movable plate 30 lies in a common plane with the side plate 26. The tab 31 which is on the inside of it supports the pivotally mounted plate 30. The plate 30 supports a bolt 33 which serves as a pivot for a roller 34. The roller 34 functions in conjunction with the roller 28, the two rollers serving to hold the equipment on the pipe and are shown at the left hand side of the drawings.

Again, the equipment is symetrically constructed at both ends. The pivotal plate 30 thus is duplicated. They are joined together by an L-shaped bar 35. It assures that the extension plates 30 pivot and move together as a unit.

Figure 3:
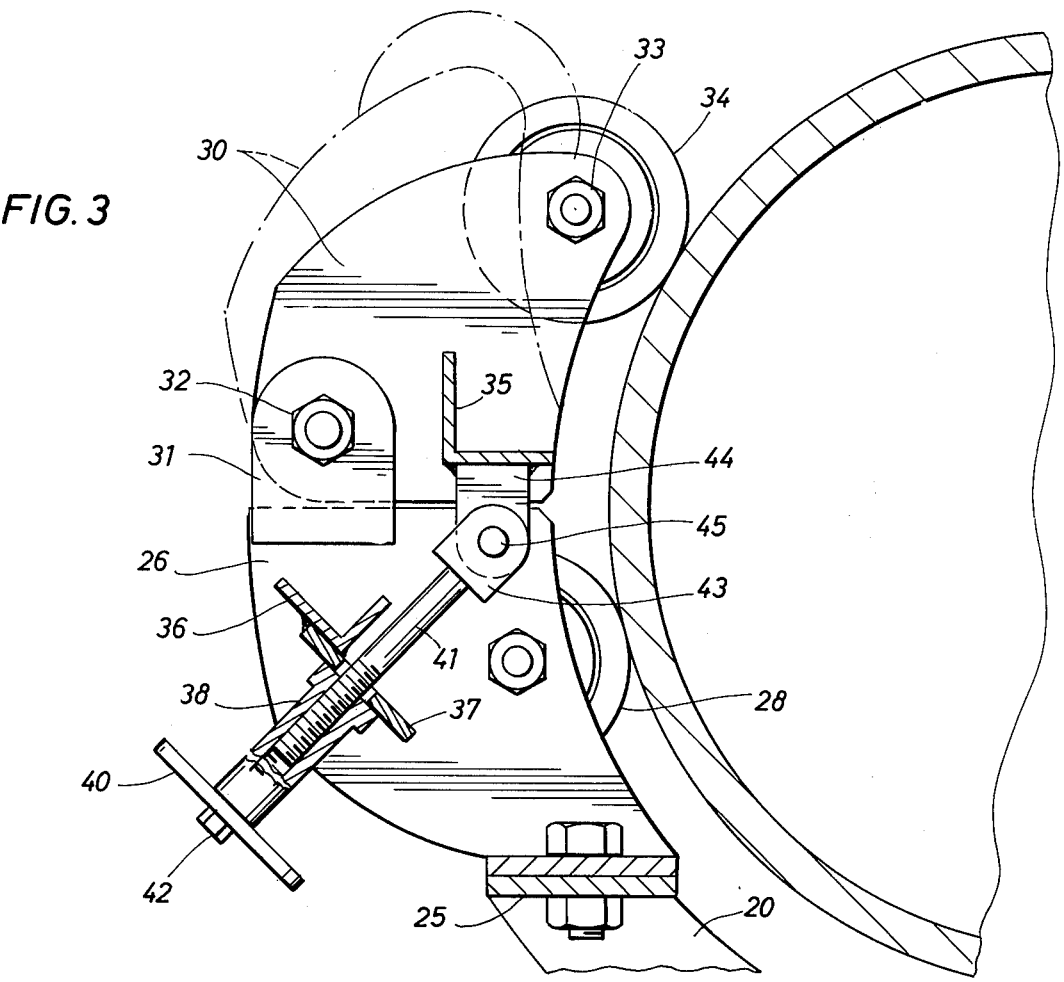
FIG. 3 is an enlarged sectional view along the line 3—3 of FIG. 2 showing a set of rollers and a mechanism by which they are mounted and made operative.

The two side plates 26 are themselves joined together by a transverse piece of angled stock 36. The angled stock 36 makes the structure rigid and keeps the side plates 26 parallel to one another. The angled stock 36 has a downwardly extending tab 37 welded to it as shown in FIG. 3. The tab 37 supports an internally threaded fixed bushing 38. The bushing 38 is held stationary relative to the tab 37. The numeral 40 identifies a large washer which serves as a hand wheel for rotation of a shaft 41 which extends through the bushing 38. The hand wheel 40 is joined to the shaft 41 by means of a bolt 42 threaded into an axially located tapped opening in the shaft 41. The hand wheel is rotated clockwise or counterclockwise to advance and retract the shaft 41. It connects to a clevis 43 at its upper most end. It is pivotally joined to the clevis. The clevis itself surrounds on both sides a downwardly protruding tab 44 affixed to the transverse bracket 35. The clevis 43 is joined to the tab 44 by a pin 45.

The hand wheel 42 is rotated to raise and lower the plate 30. The dotted line position of FIG. 3 shows it after it has been raised some distance. When it is raised, it rotates away from the full line position of FIG. 3. This opens the throat of the equipment to grasp the pipe 12. It will be appreciated that the pipe is not held until it has been encircled by at least 180° on attachment of the applicator of the present invention. In other words, it is not possible to grasp a round object without grasping at least 180° of its circumference. It will be observed in FIG. 1 of the drawings that the roller 34 assures that the device adequately grasps the pipe. Only when this occurs is a positive connection between the applicator 10 and the pipe achieved. The positive connection is achieved after the extension plate 30 is pulled down to the full line position of FIG. 3. The extent of opening may vary depending on the irregularities in manufacture of the pipe and many other factors. It is sufficient to note that the roller 34 is able to be pivoted out of the way and back into the full line position to clamp the apparatus 10 to the pipe. The connection is positive and yet permits the equipment to rotate all the way around the pipe supported on the four rollers which are brought into contact with the pipe.

Observing the general layout of the four rollers as depicted in FIG. 1, and keeping in mind that two sets of such rollers are incorporated, one on each end of the equipment as shown in FIG. 2, it would generally be observed that two of the rollers are located below a diameter through the pipe and two are above the diameter. Thus the rollers on the left cooperating with the rollers on the right serve as a type of clamp mechanism securing the pipe coating apparatus 10 to the pipe. Through the use of the rollers, the apparatus can be rotated so that it travels in a circle around the pipe. Because it is clamped on the pipe, it rotates about the pipe. Moreover, the pipe can be engaged and disengaged by operation of the hand wheel 40 previously discussed.

Going now to FIG. 2 of the drawings, the end plate 15 supports a shaft 47 which in turn supports a spool of coating material 14. The spool is shown in dotted line in FIG. 2. It is caught between a first hub 48 and a second hub 49 which are both mounted on the shaft 47.

The shaft 47 is received through a slot 50 formed in the end plate 15. The slot is wide enough to receive the shaft. The shaft extends beyond the end plate 15 to position its tip end on the exterior. The shaft rests at the left hand extremity of the slot 50 which is arcuate to accept the shaft and hold it. The shaft is held in position by means of a sliding gate latch mechanism. The gate latch mechanism includes a base plate 51 which is generally flat around the edges to define a mounting lip and is curved in the center to capture a slide bar 52. The slide bar 52 is received in a pocket defined by the base plate 51. It can slide vertically as depicted in FIG. 1 of the drawings. It supports a laterally projecting lever 52. The lever 52 can be hand grasped to be raised and lowered to move the slide bar vertically into a locking or releasing position. When the bar 52 is raised, the shaft 47 is free to escape from the slot 50.

It is desirable that the shaft 47 not rotate and to this end, a flat is formed on the end of it. The flat keys against a thickened shoulder 54. The shoulder 54 is adjacent to the slot and holds the shaft 47 against rotation when it is locked in position.

As described to this point, the shaft 47 thus supports a spool of insulative material. The shaft is held stationary. It is locked in position and additionally is prevented from rotating.

Figure 4:
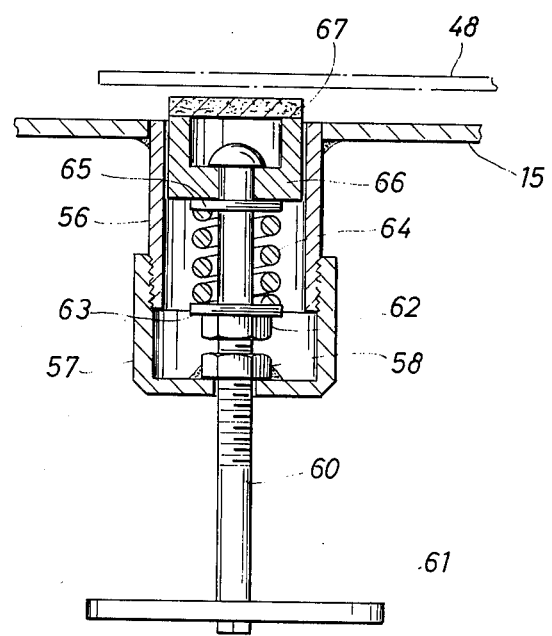
FIG. 4 is an enlarged detailed view of a brake mechanism for controlling tension of the wrapping material applied to the pipe.

The spool of material is reeled off to the pipe 12. It is guided and aligned between the hubs 48 and 49. The hubs hold the material on a spool centered in the roll of material. It will be observed that the hubs 48 and 49 are similar in construction except that the hub 48 has a larger diameter. It has an outer face which is shown in enlarged detail in FIG. 4 of the drawings. The outer face serves as a breaking surface. It cooperates with a brake mechanism better shown in FIG. 4. The brake mechanism itself incorporates a cylindrical body 56 which is threaded on its exterior to receive a cap 57 thereon. The cap 57 is welded to a threaded nut on the interior. A threaded shaft 60 supporting a hand wheel 61 extends through the nut. It is able to rotate. As it rotates, the shaft 60 advances inwardly or outwardly of the brake mechanism depending on direction of the rotation.

A stop nut 62 is supported on the shaft 60. A large washer is adjacent to it. The washer serves as a seat for a spring. The spring 64 bears against a similar thrust washer 65 which in turn abuts a hollow shoe support 66. The support 66 encompasses the head of the shaft 60 to lock the equipment together. Rotation is permitted. In addition, it has a peripheral edge to which is adhesively glued a disc of brake material 67. The brake material may be asbestos, for example. It is contacted against the hub 48 to slow the rotation of the roll of material, thereby imparting controlled drag to the supply of insulating material. The apparatus incorporates the brake to retard spooling out the insulative material. It is applied with drag to assure constant or uniform tension in the strip of material applied to the pipe 12.

The apparatus has several advantages. For one, it can be used with pipes of different diameters. The braces 18 and 20 need only be exchanged for braces of similar shape but having a different radius of curvature to thereby adapt the equipment for pipes of different sizes. When the equipment is placed on a pipe of different size, the throat across the rollers is adjusted by the substitution of different sized braces 18 and 20. The size of the rollers of course is immaterial within a very broad range. The apparatus normally is used to apply a strip of material of fixed width. Smaller strips can be applied provided the hubs 48 and 49 are correctly spaced on the shaft 47 so they are able to be contacted by the brake mechanism. The brake mechanism itself is used until worn and then it is tightened to maintain constant tension.

The present invention is uniquely able to wrap a bare metal portion of a pipe, particularly near a weld. The apparatus is placed around the pipe by rotating the roller 34 and the appended equipment, all as depicted in FIG. 3, the rotation extending from the dotted line position illustrated whereupon the applicator 10 is positioned about the pipe and clamped to the pipe. Once it is placed on the pipe, the rollers 34 are brought into contact with the pipe to thereby lock the entire mechanism. Once the mechanism is locked on the pipe, it is in a position to be rotated one revolution to fully wrap the pipe. Preferably, the wrapping material is overlapped slightly, perhaps only a fraction of a revolution, so that the insulative material is contacted against itself.

The foregoing is directed to the preferred embodiment but the scope of the present invention is determined by the claims which follow.

I claim:

1. An apparatus for placing a cigarette wrap of insulative material around a pipe at a bare place prior to placing the pipe in the ground, comprising:
    two sets of first, second and third alignment rollers;
    a framework supporting said two sets of first, second and third rollers which positions said two sets of rollers in contact with a pipe to be coated, and wherein the two sets are spaced apart from one another and where said rollers being spaced around the pipe to clamp said framework to the pipe while yet permitting the framework to rotate around the pipe one revolution which rotational movement is supported on said rollers; and
    supply means carried by said framework for receiving and dispensing insulative material in sheet form directly onto the pipe with a specified tension and alignment and between said two sets of rollers to place one turn of such material on the pipe and wherein said supply means carries the sheet of material around the pipe to place a cigarette wrap thereon.

2. The apparatus of claim 1 including a brake means connected to said supply means to place tension in the sheet material on application as it is wrapped around the pipe, and wherein said supply means is positioned by said framework such that the sheet material wraps directly around the pipe.

3. The apparatus of claim 1 including a pivot mounting means supporting one of said rollers for pivotal movement out of the way on placing said framework on the pipe, and which pivotally moves said roller adjacent to the edge of the insulative material.

4. The apparatus of claim 3 including a lock means for locking said pivotally mounted edge located roller against the pipe.

5. The apparatus of claim 1 wherein said framework incorporates an arcuate member which encircles about 180° of the pipe, and further including a fourth roller in each of said two sets, and two of said rollers in each set are at end of said arcuate member, and the remaining two are at the other end of said arcuate member, and said rollers are spaced as follows using the first roller as a reference: said second roller is between the first and third rollers; said third roller is less than 180° around the pipe while the fourth roller is beyond the third and more than 180° from the first; and the first, second and third rollers are located on a common semicircle with said arcuate member relative to the pipe.

6. The apparatus of claim 5 including at least two spaced frame members extending along the pipe between first and second spacial arcuate members to join them together and define a rigid structure.

7. The apparatus of claim 6 including means for removing said arcuate members and substituting similar arcuate members sized to fit said rollers against pipes of differing diameters.

8. The apparatus of claim 7 including a first and second latch means for releasably locking said supply means in place.

9. The apparatus of claim 8 including parallel plates in a common plane with said arcuate members which each support said first and second latch means.

10. An apparatus for placing a cigarette wrap of insulative material around a pipe at a bare place prior to placing the pipe in the ground, comprising:
    first, second and third rollers;
    a framework supporting said first, second and third rollers which positions said rollers in contact with a pipe to be coated, said rollers being spaced around the pipe to clamp said framework to the pipe and yet permitting the framework to rotate around the pipe one revolution which rotational movement is supported on said rollers;
    supply means carried by said framework for receiving and dispensing insulative material in sheet form onto the pipe to place one turn of such material on the pipe and wherein said supply means carries the sheet of material around the pipe to place a cigarette wrap thereon; and
    said rollers being edge located relative to said supply means so that the sheet insulative material is applied to the pipe adjacent to the locus of the rollers on the pipe.

* * * * *